Oct. 5, 1954 C. R. FISHER, JR 2,691,066

AUTOMATIC TELEPHONE SYSTEM

Filed Sept. 17, 1953 3 Sheets-Sheet 1

INVENTOR.
CHARLES R. FISHER JR.
BY Floyd V. Henson
AGENT

Oct. 5, 1954 C. R. FISHER, JR 2,691,066

AUTOMATIC TELEPHONE SYSTEM

Filed Sept. 17, 1953 3 Sheets-Sheet 2

Patented Oct. 5, 1954 2,691,066

UNITED STATES PATENT OFFICE 2,691,066

AUTOMATIC TELEPHONE SYSTEM

Charles R. Fisher, Jr., Rochester, N. Y., assignor to Stromberg-Carlson Company, a corporation of New York Application September 17, 1953, Serial No. 380,829

6 Claims. (Cl. 179—16)

This invention relates to automatic telephone systems and particularly to systems comprising digit absorbing selector switches.

Digit absorbing selectors have gained widespread use in local and toll switch trains for universal numbering purposes. In small community offices it is sometimes necessary to absorb as many as two or three digits before the digits effective to select the desired line number are registered.

The test train, however, has presented special problems insofar as digit absorbing is concerned. In some installations a toll operator or test operator in making busy verification tests, or other tests, has been instructed to dial only the line selecting digits. This method defeats the purpose of universal numbering since the operator is forced to dial one number when connecting with a subscriber's line over the toll switch train and a different number when connecting with the same line via the test train.

In very small offices where one test selector is sufficient, it is satisfactory to incorporate the digit absorbing feature in the test selector. Where more than one test selector is required, however, it is advantageous, for economical reasons, to provide the digit absorbing feature in the circuit which selects the test selector to be used. Standard two-motion digit absorbing selectors have been used for this purpose, but are again uneconomical where only a few test selectors are required in the office.

It is a general object of this invention to provide more efficient switching in telephone systems having universal numbering schemes.

It is a further object of the invention to provide a single motion selecting switch capable of absorbing a plurality of digits and also capable of utilizing all of its step positions for connection to subsequent circuits.

It is a feature of the invention to utilize the sleeve bank and wiper of the switch for digit absorbing marking and also for connection to the sleeve conductors of succeeding circuits.

According to the invention, the control circuit for the digit absorbing selecting switch is arranged to step the switch in a uniform manner in response to the non-controlling impulse series independent of the number of impulses in the impulse series. Thus, the circuit is arranged to absorb a definite number of impulse series rather than any particular impulse series. When the proper number of impulse series has been absorbed, the control circuit is arranged to release the switch and modify its operation so that it can be stepped in accordance with the impulses of a further impulse series to select a corresponding desired subsequent circuit.

The invention, both as to its organization and method of operation together with objects and advantages thereof, will best be understood by reference to the following specification taken in connection with the accompanying drawings:

Fig. 1 shows the trunking diagram for the system described herein.

Figs. 2 and 3, when arranged with Fig. 3 to the right of Fig. 2, illustrate details of apparatus shown in Fig. 1.

The general operation of the illustrated system can best be understood by reference to the trunking diagram of Fig. 1. A call extended from the test turret 23 to a line circuit, such as line circuit 27, is initiated by the operation of a key or other suitable means at the test turret to seize test selector selector 24. The impulse transmitter at the test turret then controls the test selector selector which absorbs the desired number of digits and then selects the desired thousands group test selector which is assumed to be test selector 25. Test selector 25 is then stepped under control of the impulse transmitter to select the test connector associated with the desired 100-line group. This is assumed to be test connector 26. Further impulses from the impulse transmitter are repeated by the test selector 25 to step test connector 26 to the desired tens and units positions for connection to the desired line circuit 27. The ring digit, if any, is absorbed by the test connector.

Connection from a toll office is initiated by the seizure of outgoing trunk circuit 12 at toll board 11. Seizure of outgoing trunk circuit 12 results in the seizure of incoming trunk circuit 21 and its associated incoming toll selector 22 in community dial office 20. The operator then dials the prefix digit "1" to seize test selector selector 24. The operator then dials the complete directory number of the desired line and the circuits function as described above.

The test selector selector is shown in Fig. 3. The selecting switch comprises stepping magnet MX, release magnet MZ, wipers T, R and S and their associated bank contacts. Relays 210, 220, 230, 240, 250, 260, 300 and 310 comprise the control circuit for the selecting switch. Relay 310 is employed as a switching means in the control circuit for modifying the operation of the switch at the completion of the dialing of the non-controlling impulse series. The connection of strap or jumper S31, shown at lower right of Fig. 3, determines the number of digits which are absorbed. If strap S31 is connected to terminal 0, no digits are absorbed. If strap S31 is connected to terminal 1, one digit is absorbed, etc.

In the drawings and description the exchange battery is shown as plus and minus and described as ground and battery. It is to be understood that in this system the positive terminal of the battery is grounded and is, therefore, referred to as ground. The negative terminal of the battery is referred to as battery.

*Detailed description*

Figure 1:
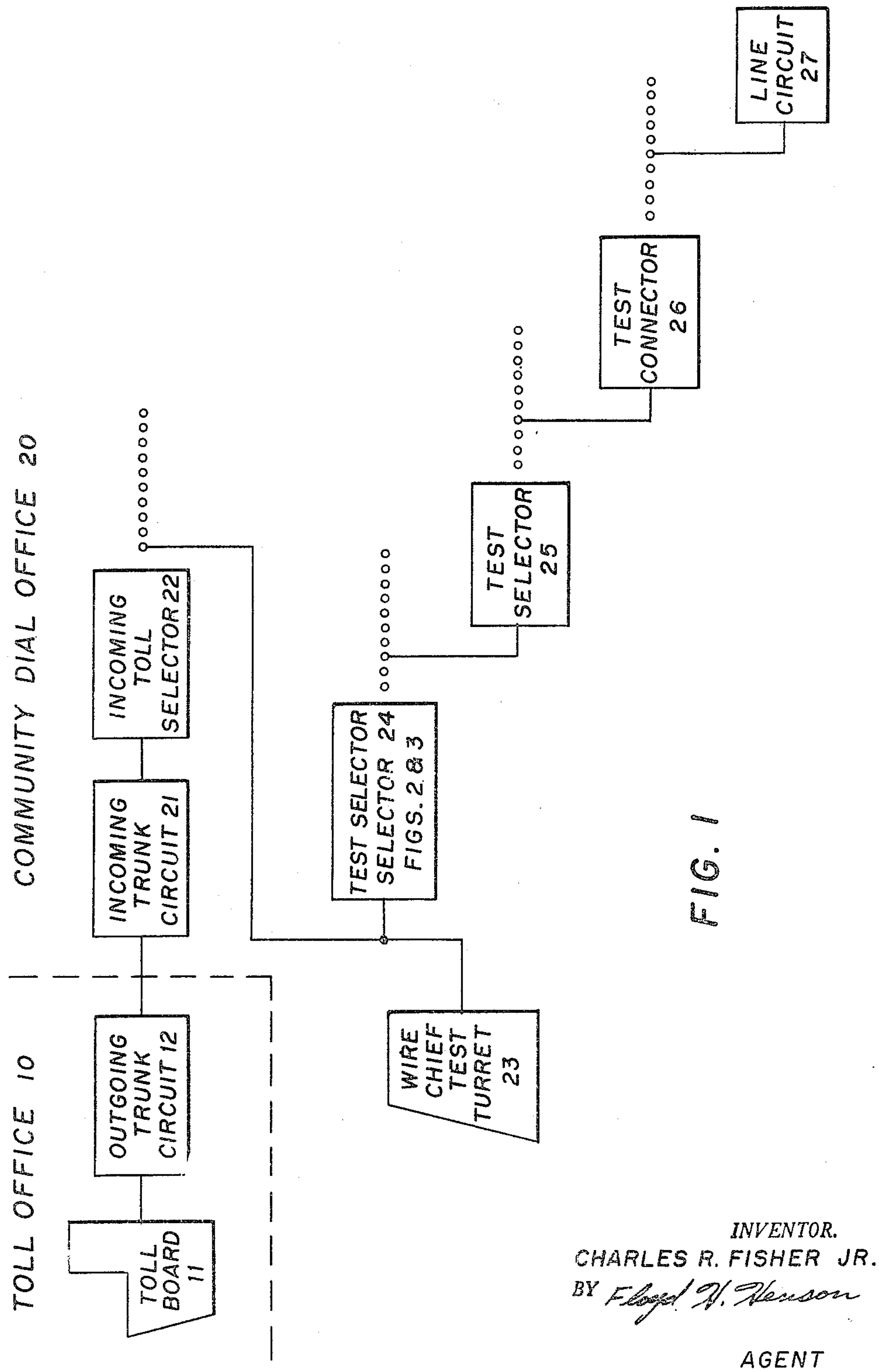
Figure 2:
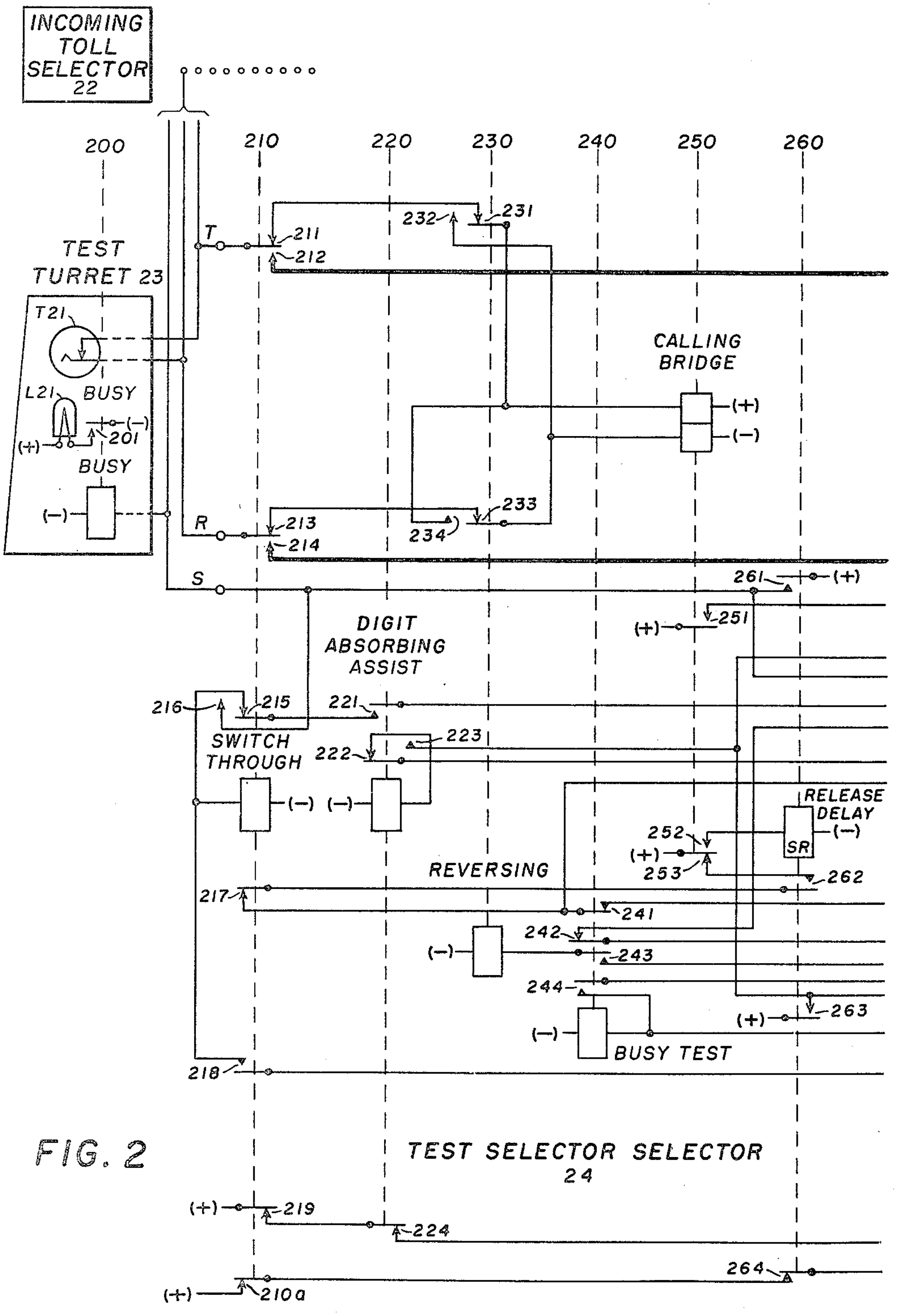
Figure 3:
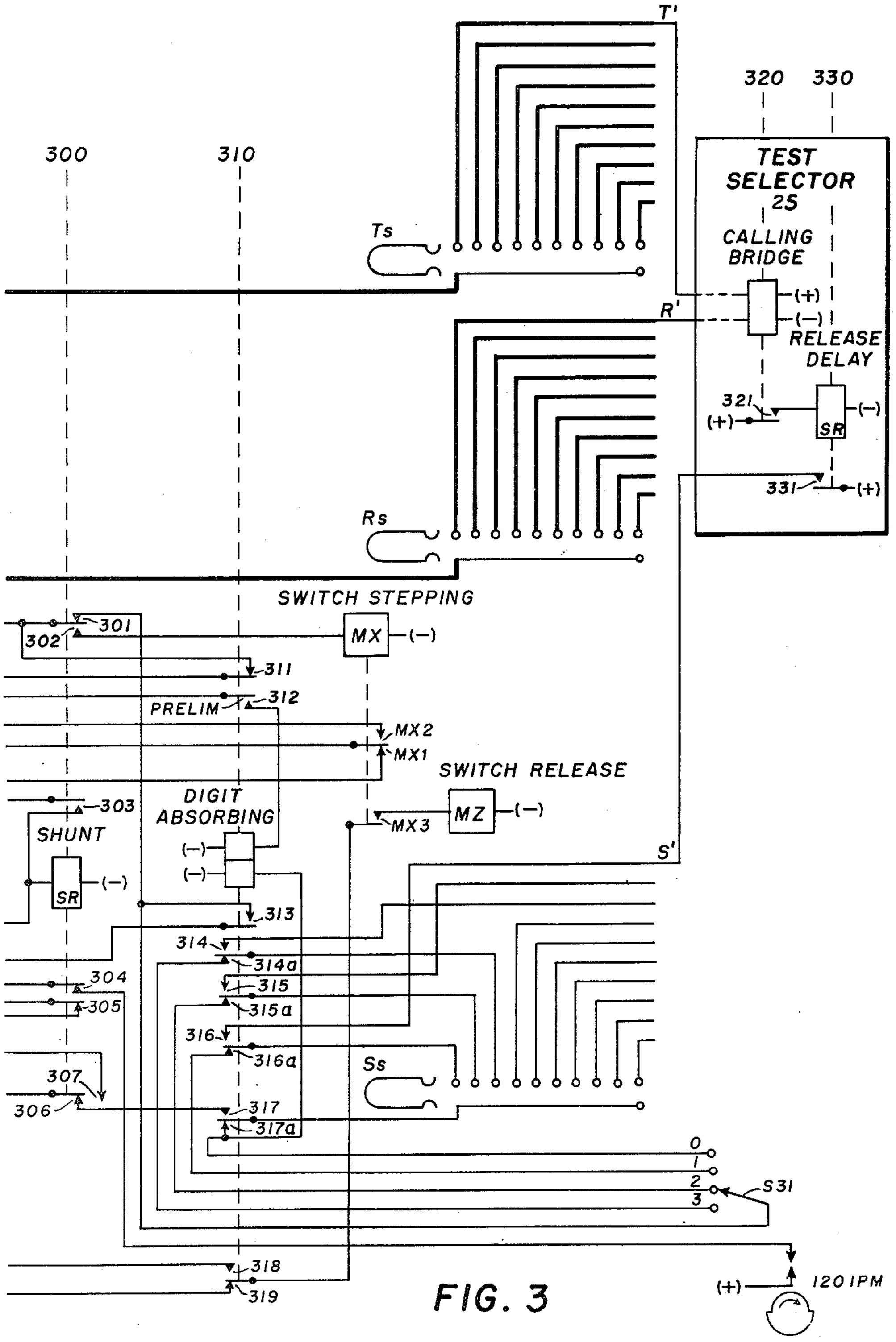

A call originated at test turret 23 will first be described. Assume that strap S31 of Fig. 3 is connected to terminal 2, as shown, so that two digits will be absorbed by the test selector selector 24.

The operator at the test turret completes an operating circuit for the calling bridge relay 250 by the connection of the impulse transmitter T21 to the tip and ring leads T and R, respectively, by a key or any suitable means (not shown). The operating circuit for relay 250 is as follows: Ground through the upper winding of relay 250, unoperated contacts 231 of relay 230, unoperated contacts 211 of relay 210, impulse contacts of impulse transmitter T21, unoperated contacts 213 of relay 210, unoperated contacts 233 of relay 230, and the lower winding of relay 250 to battery. The operation of relay 250 results in the operation of release delay relay 260 over an obvious circuit from ground through operated contacts 252 of relay 250.

At operated contacts 261, relay 260 grounds the sleeve conductor S to operate busy relay 200 in the test turret and also to mark the sleeve conductor appearance of this circuit in the banks of incoming toll selector 22 as busy. Relay 200, at contacts 201, closes battery to the busy lamp L21 associated with the test selector selector appearance at the test turret.

Calling bridge relay 250 will pulse in accordance with the impulses transmitted by impulse transmitter T21. The first release of relay 250, in response to the first opening of the impulse springs, operates shunt relay 300 over the following path: Ground through unoperated contacts 253 of relay 250, operated contacts 262 of relay 260, unoperated contacts 217 of relay 210, unoperated contacts 241 of relay 240, through the winding of relay 300 to battery. Relays 260 and 300 are of the slow-release type and remain operated during the series of impulses. Reoperation of relay 250 on the next closure of the impulse springs closes ground through its operated contacts 251 and through operated contacts 302 of relay 300 to the switch stepping magnet MX. A shunt ground is also completed from ground through operated contacts 263 on relay 260 through normal contacts 311 of relay 310 and through operated contacts 302 of relay 300 to the MX magnet. Thus, it can be seen that since shunt relay 300 remains operated during a complete series of impulses the MX magnet will be operated continuously from this shunt ground independent of the number of pulses generated by contacts 251 on relay 250. At the completion of the first series of impulses, relay 300 releases to open the circuit to release the switch stepping magnet MX. The next series of impulses will again operate relay 300 and result in stepping the switch to the second position.

At the completion of the second series of impulses and the subsequent release of relay 300, the path is completed for the operation of switching means comprising digit absorbing relay 310 in the following manner: Ground through operated contacts 251 of relay 250, through unoperated contacts 301 of relay 300 over strap S31 to terminal 2, through unoperated contacts 315a of relay 310, through the second bank terminal of the minor switch sleeve bank, the wiper Ss of the switch, unoperated contacts 317a of relay 310 and through the lower winding of relay 310 to battery. Relay 310 closes a preliminary make locking contact 312 to lock itself operated over its upper winding to the sleeve conductor S. Operation of relay 310 results in the energization of the switch release magnet MZ to release the switch. The operating path is from ground through unoperated contacts 219 of relay 210, unoperated contacts 224 of relay 220, operated contacts 318 of relay 310, operated minor switch off-normal contacts MX3, and through the winding of the MZ magnet to battery. Restoration of the switch to the normal position results in the operation of the digit absorbing assist relay 220 from ground through operated contacts 251 of relay 250, unoperated contacts 301 of relay 300, operated contacts 313 of relay 310, unoperated contacts 242 of relay 240, unoperated minor switch off-normal contacts MX1, unoperated contacts 222 of relay 220, and through the winding of relay 220 to battery. Relay 220 locks itself operated through its make-before-break contacts 223 to ground on contacts 263 of relay 260. Operation of relay 220 serves the purpose of opening contacts 224 so that the switch release magnet MZ will not be energized when the switch is again stepped off-normal in response to a further series of impulses.

The operation of digit absorbing relay 310 serves several other functions at this time. The original digit absorbing marking ground on conductor S31 is now disconnected from the second bank terminal of the minor switch by the operation of contacts 315a. The bank terminals are now connected to the sleeve conductors of subsequent circuits as follows: The first bank terminal is connected through operated contacts 316 to the sleeve conductor S′ of the first test selector, the second bank terminal is now connected through operated contacts 315 to the sleeve conductor of the second test selector (not shown), and the third sleeve bank terminal is connected through operated contacts 314 to the sleeve conductor of the third test selector (not shown). The operation of relay 310 also serves to modify the operation of the switch so that it will now be responsive to each impulse in a further impulse series. This is accomplished by the operation of contacts 311 which remove the shunt for the impulsing contacts 251 of relay 250. A further impulse series dialed into this circuit will release and operate relay 250 on each impulse, as previously described. The first release of relay 250 results in the operation of shunt relay 300, as previously described. The reoperation of relay 250 will connect ground through operated contacts 251 and through operated contacts 302 on relay 300 to operate the switch stepping magnet MX. It can be seen that since contact 311 is now operated, the switch will be stepped in response to each impulse of pulsing contact 251.

During the operation of shunt relay 300 in response to this impulse series, the winding of busy test relay 240 is connected through operated contacts 307 of relay 300 and through operated contacts 317 of relay 310 to the sleeve wiper Ss for making a busy test of the selected circuit. It is to be noted that the busy test relay may operate as the switch wiper passes over busy sleeve conductors even though the desired test selector is idle. For this reason, relay 300 locks itself operated through its operated contacts 303 independently of contacts 241 on relay 240 and over the path from ground on unoperated contacts 253 of relay 250, through operated contacts 262 on relay 260, and unoperated contacts 217 on relay 210.

If the selected test selector is busy, ground on its sleeve conductor S' will operate the busy test relay 240 and hold it operated until the release of the shunt relay 300 at the termination of the impulse series. The busy test relay is then locked operated from ground on operated contacts 263 of relay 260 and through unoperated contacts 305 on shunt relay 300, through its own operated contacts 244 and through its winding to battery. 120 I. P. M. ground is then connected through unoperated contacts 304 of relay 300 and through operated contacts 243 of relay 240 to flash the reversing relay 230. Relay 230 will then intermittently reverse the battery over the calling conductors in accordance with the 120 I. P. M. flash at its contacts 231 232, 233 and 234 to give the test turret operator supervision in the well known manner.

If the selected test selector is idle, busy test relay 240 does not operate and upon the release of shunt relay 300 at the termination of the impulse series, switch-through relay 210 is operated in the following manner: Ground through operated contacts 251 of relay 250, through unoperated contacts 301 of relay 300, through operated contacts 313 of relay 310, through unoperated contacts 242 of relay 240, through operated minor switch off-normal contacts MX2, through operated contacts 221 of relay 220, unoperated contacts 215 of relay 210, and through the winding of 210 to battery. Switch-through relay 210 locks itself operated to the sleeve conductor through its make-before-break contacts 216. Operation of switch-through relay 210 disconnects the calling bridge relay 250 of this circuit from the talking conductors at operated contacts 211 and 213 and connects the talking conductors T and R through contacts 212 and 214, respectively, and through the tip and ring wipers and banks Ts and Rs of the minor switch, respectively, to the calling bridge relay 320 of test selector 25. Relay 320 operates and, at contacts 321, closes an obvious operating circuit for release delay relay 330. Relay 330, at contacts 331, connects ground to the sleeve conductor S', through operated contacts 316 of relay 310, the sleeve terminal bank and wiper Ss, operated contacts 317 of relay 310, unoperated contacts 306 of relay 300, operated contacts 218 of relay 210 to the winding of relay 210 and also through operated contacts 216 of relay 210 to the sleeve conductor S.

The disconnection of calling bridge 250 from the talking conductors upon the operation of switch-through relay 210 resulted in the release of relay 250. The opening of contacts 252 on relay 250 opened the energizing circuit for relay 260. Relay 260 has sufficient release time to cover the operate time of relays 320 and 330 in test selector 25. Thus, ground from contacts 331 of relay 330 is applied to the sleeve conductor to maintain relays 210 and 310 operated before ground at operated contacts 261 of relay 260 is removed.

It can be seen that further series of impulses will control relay 320 in test selector 25 to step the succeeding switches of the test train. When the operator at the test turret wishes to release the connection, the impulse transmitter T21 is disconnected from the tip and ring conductors by the restoration of a key or any other suitable means. This results in the release of relays 320 and 330. The release of relay 330 results in the removal of ground from the sleeve conductor S' at contacts 331. When this ground is removed, relays 210 and 310 in test selector selector 24 release. The switch release magnet MZ is then energized over the following path to release the switch: Ground through unoperated contacts 210A on relay 210, unoperated contacts 264 on relay 260, unoperated contacts 319 on relay 310, operated minor switch off-normal contacts MX3, and through the winding of the MZ magnet to battery.

A call from the distant toll office 20 routed through incoming toll selector 22 will control this circuit and the subsequent circuits in an identical manner. As before, when this circuit is seized, ground on the sleeve will serve to operate busy relay 200 and illuminate busy lamp L21 at the test turret 23. This indication will inform the operator at the test turret that the circuit is being used by the toll operator.

While there has been disclosed what is at present considered to be the preferred embodiment of the invention, it will be understood that various modifications may be made therein and it is intended to cover in the appended claims all such modifications as fall within the true spirit and scope of the invention.

What is claimed is:

1. In a telephone system, a digit absorbing selecting switch having a normal position and a plurality of stepped positions, said switch having a plurality of bank terminals corresponding to said plurality of positions and a wiper adapted to engage successive ones of said bank terminals, a control circuit for said switch, marking means normally connected to a predetermined one of said bank terminals, an impulse transmitter, means for connecting said impulse transmitter to said control circuit, means in said control circuit responsive to a series of impulses from said impulse transmitter to step said switch in a predetermined manner independent of the number of impulses in said series of impulses, switching means in said control circuit, means responsive to the connection of the wiper to the marking means for operating said switching means, means responsive to the operation of said switching means for restoring said switch to its normal position, and means also responsive to the operation of said switching means for modifying the operation of said switch so that it will respond to the impulses of a further series of impulses to then step said switch for each impulse of the further series of impulses.

2. In a telephone system, a digit absorbing selecting switch having a normal position and a plurality of stepped positions, said switch having a plurality of bank terminals corresponding to said plurality of positions and a wiper adapted to engage successive ones of said bank terminals, a control circuit for said switch, marking means normally connected to a predetermined one of said bank terminals, a plurality of other circuits adapted to be individually connected to respective ones of the bank terminals, an impulse transmitter, means for connecting said transmitter to said control circuit, means in said control circuit responsive to a series of impulses from the impulse transmitter to step said switch in a predetermined manner independent of the number of impulses in the series of impulses, switching means in said control circuit, means responsive to the connection of the wiper to the marking means for operating said switching means, means responsive to the operation of said switching means for restoring said switch to its normal position, means also responsive to the operation of the switching means for disconnecting said marking means from the predetermined bank terminal and for connecting said other circuits to the respective bank terminals of the switch, and means also responsive to the operation of the switching means for modifying the operation of said switch so that it will respond to the impulses of a further series of impulses to then step said switch for each impulse of the further series of impulses, thereby to establish connection with a selected one of said other circuits.

3. In a telephone system, a digit absorbing selecting switch having a normal position and a plurality of stepped positions, said switch having a plurality of tip, ring and sleeve bank terminals corresponding to said plurality of positions and tip, ring and sleeve wipers adapted to engage successive ones of said bank terminals, a control circuit for said switch, marking means normally connected to a predetermined one of said sleeve bank terminals, a plurality of selector circuits, tip, ring and sleeve conductors associated with said selector circuits, said tip and ring conductors being individually connected to respective ones of the tip and ring terminals and said sleeve conductors being adapted to be individually connected to respective ones of the sleeve bank terminals, an impulse transmitter, means for connecting said transmitter to said control circuit, means in said control circuit responsive to a series of impulses from the impulse transmitter to step said switch in a predetermined manner independent of the number of impulses in the series of impulses, switching means in said control circuit, means responsive to the connection of the sleeve wiper to the marking means for operating said switching means, means responsive to the operation of said switching means for restoring said switch to its normal position, means also responsive to the operation of the switching means for disconnecting said marking means from the predetermined sleeve bank terminal and for connecting said selector sleeve conductors to the respective sleeve bank terminals of the switch, and means also responsive to the operation of the switching means for modifying the operation of said switch so that it will respond to the impulses of a further series of impulses to then step said switch for each impulse of the further series of impulses, thereby to establish connection with a selected one of said selector circuits.

4. In a telephone system, a digit absorbing selecting switch having a normal position and a plurality of stepped positions, said switch having a plurality of bank terminals corresponding to said plurality of positions and a wiper adapted to engage successive ones of said bank terminals, a control circuit for said switch, marking means normally connected to a predetermined one of said bank terminals, a plurality of other circuits adapted to be individually connected to respective ones of the bank terminals, an impulse transmitter, means for connecting said impulse transmitter to said control circuit, means in said control circuit responsive to a series of impulses from the impulse transmitter to step said switch in a predetermined manner independent of the number of impulses in the series of impulses, switching means in said control circuit, means responsive to the connection of the wiper to the marking means for operating said switching means, means responsive to the operation of said switching means for restoring said switch to its normal position, means also responsive to the operation of the switching means for disconnecting said marking means from the predetermined bank terminal and for connecting said other circuits to the respective bank terminals of the switch, and means also responsive to the operation of the switching means for modifying the operation of said switch so that it will respond to the impulses of a further series of impulses to then step said switch for each impulse of the further series of impulses, testing means in said control circuit, and means responsive to the operation of said switching means for connecting said testing means to said wiper.

5. In a telephone system, a digit absorbing selecting switch having a normal position and a plurality of stepped positions, said switch having a plurality of bank terminals corresponding to said plurality of positions and a wiper adapted to engage successive ones of said bank terminals, a control circuit for said switch, a plurality of circuits adapted to be individually connected to respective ones of the bank terminals, an impulse transmitter, means for connecting said impulse transmitter to said control circuit, means in said control circuit responsive to a series of impulses from said transmitter to step said switch in a predetermined manner independent of the number of impulses in the series of impulses, first and second relays in said control circuit, said second relay being adapted to be operated during each series of impulses and released in the interval between series of impulses, marking means connected through normally closed contacts of said first and second relays to a predetermined one of said bank terminals, means responsive to the connection of the wiper to the marking means and the release of said second relay for operating said first relay, means responsive to the operation of the first relay for locking said first relay operated so long as the impulse transmitter is connected to the control circuit, means also responsive to the operation of said first relay for restoring said switch to its normal position, means also responsive to operation of said first relay for disconnecting said marking means from the predetermined bank terminal and for connecting said circuits to the respective bank terminals of the switch, and means also responsive to operation of said first relay for modifying the operation of said switch so that it will respond to the impulses of a further series of impulses to then step said switch for each impulse of the further series of impulses, thereby to establish connection with a selected one of said other circuits.

6. In a telephone system, a digit absorbing selecting switch having a normal position and a plurality of stepped positions, said switch having a plurality of bank terminals corresponding to said plurality of positions and a wiper adapted to engage successive ones of said bank terminals, a control circuit for said switch, a plurality of circuits adapted to be individually connected to respective ones of the bank terminals, an impulse transmitter, means for connecting said impulse transmitter to said control circuit, means in said control circuit responsive to a series of impulses from said transmitter to step said switch in a predetermined manner independent of the number of impulses in the series of impulses, first and second relays in said control circuit, said second relay being adapted to be operated during each series of impulses and released in the interval between series of impulses, marking means connected through normally closed contacts of said first and second relays to a predetermined one of said bank terminals, means responsive to the connection of the wiper to the marking means and the release of said second relay for operating said first relay, means responsive to the operation of said first relay for locking said first relay operated so long as the impulse transmitter is connected to the control circuit, means also responsive to the operation of said first relay for restoring said switch to its normal position, means also responsive to operation of said first relay for disconnecting said marking means from the predetermined bank terminal and for connecting said circuits to the respective bank terminals of the switch, and means also responsive to operation of said first relay for modifying the operation of said switch so that it will respond to the impulses of a further series of impulses to then step said switch for each impulse of the further series of impulses, testing means in said control circuit, and means responsive to the operation of said first relay and to the operation of said second relay during the further series of impulses for connecting said testing means to said wiper.

References Cited in the file of this patent

UNITED STATES PATENTS

| Number | Name | Date |
|---|---|---|
| 1,805,778 | Mercer | May 19, 1931 |
| 2,170,885 | Wright | Aug. 29, 1939 |
| 2,271,878 | Wadsworth | Feb. 3, 1942 |
| 2,578,071 | Jones et al. | Dec. 11, 1951 |